April 17, 1962

G. MOUNTJOY 3,029,890

VEHICLE SKID CONTROL

Filed Aug. 25, 1958

INVENTOR.
Garrard Mountjoy
BY
D. L. Sadler
ATTORNEY

April 17, 1962  G. MOUNTJOY  3,029,890
VEHICLE SKID CONTROL
Filed Aug. 25, 1958  2 Sheets-Sheet 2

INVENTOR.
Garrard Mountjoy
BY
W. R. Sadler
ATTORNEY

3,029,890
VEHICLE SKID CONTROL
Garrard Mountjoy, Little Rock, Ark., assignor to General Motors Corporation, Detroit, Mich., a corporation of Delaware
Filed Aug. 25, 1958, Ser. No. 756,785
2 Claims. (Cl. 180—79.1)

The present invention relates to vehicles and, more particularly, to means for automatically controlling the operation thereof.

During normal operating conditions an automotive vehicle traveling over a road will maintain the longitudinal axis of the vehicle parallel with the direction of travel. However, occasionally the forces acting on the vehicle exceed the friction forces on the tires and as a result the vehicle will enter into a very unstable skid condition wherein the axis of the vehicle is no longer parallel to the direction of travel. Although a skidding vehicle is normally out of or almost out of control, if proper corrective action is taken, the skid condition may be alleviated and the vehicle returned to a more stable and controllable condition. Unfortunately many drivers do not possess sufficient perception to sense the early stages of a skid and accordingly fail to correct for the skid during the early stages thereof. Also, many drivers who do sense the skid, fail to respond and take proper corrective action or take actions that aggrevate the skid condition. In addition, if the vehicle is being automatically controlled, the control system will tend to over control a skidding vehicle and aggrevate the skid unles some means are provided for modifying the controlling action during a skid.

It is therefore proposed to provide means for sensing a skidding condition in a vehicle and to initiate appropriate corrective actions. More particularly, this is to be accomplished by providing a front pickup unit and a rear pickup unit that are mounted on the vehicle at longitudinally spaced locations. These pickup units are adapted to sense the positions of the front and rear of the vehicle relative to the path of travel. Although the pickups may be of any suitable design, in the present instance they are inductive coils that sense the electromagnetic radiations from a control cable located in the roadway. Normally the front and rear pickups will be equally spaced from the control cable and the voltages induced therein will be equal and opposite. However, if both ends of the vehicle are not equally spaced from the cable as occurs during a skid the voltages in the pickup units will not be equal. The difference between the voltages from the units will be a signal indicative of the deviation of the vehicle from the direction of travel as a result of the skid. Accordingly, if the deviation is not caused as a result of some driver action, i.e. a deliberate turn, etc. the resultant signal will be effective to cause appropriate corrective actions to be taken.

Figure 1:
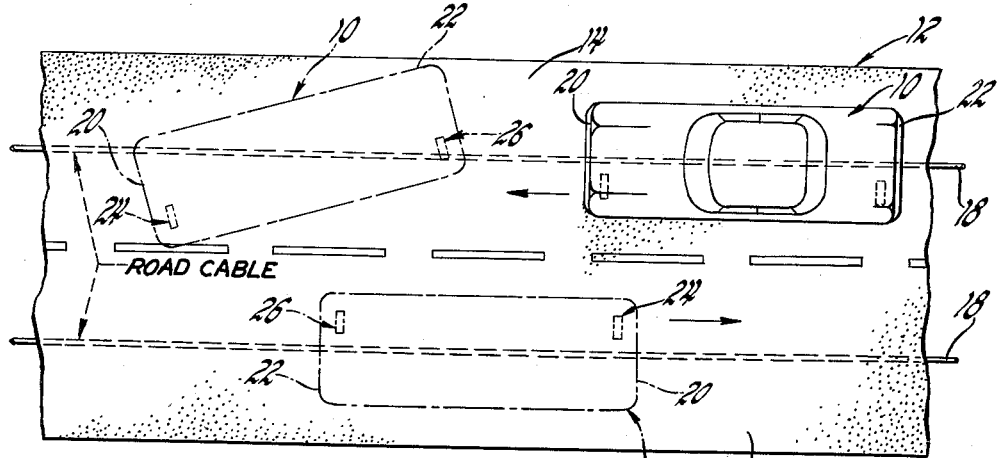
FIGURE 1 is a plan view of a portion of a highway and a vehicle traveling thereon which are equipped with one form of the present invention.

Referring to the drawings in more detail, the present invention is particularly adapted for use on vehicles 10 which travel on roadways 12 having a plurality of lanes 14 and 16. Each lane is equipped with a road cable 18 that carries an alternating electric current therethrough to form an electromagnetic field that radiates above the surface of the roadway 12. This cable 18 may be a single electrical conductor provided specifically for the present invention or preferably it may be a guidance or control cable for use in an automatic vehicle control system, such as disclosed and claimed in copending application U.S. Ser. No. 756,827, Vehicle Control System, filed August 25, 1958, in the name of Garrard Mountjoy. In such a system the control cable 18 comprises a pair of electrical conductors that are periodically crossed to form electromagnetic zones of reversing polarity and the automatically controlled vehicle is equipped with one or more inductive pickups that sense the field about the cable and utilize the information contained therein to guide the vehicle 10 along the roadway at a predetermined speed.

When a vehicle 10 is traveling along the roadway 12 the longitudinal axis of the vehicle 10 will normally be substantially parallel to the path it is following irrespective or whether it is being automatically or manually controlled. However, in the event the vehicle 10 enters into a skid condition the axis of the vehicle 10 will become oblique to the direction of travel with one end 22 of the vehicle 10 being disposed closer to the road cable 18 than the other end 20. During this condition at least the rear wheels of the vehicle are not parallel to the direction of travel and are sliding on the surface of the roadway. Under these circumstances the vehicle 10 is very unstable and is out of control. Proper corrective action must be taken immediately to restore the vehicle 10 to a more stable and controllable condition.

In order to detect when a vehicle 10 is entering and/or is in a skid condition a first pickup unit 24 is mounted on the front 20 of the vehicle 10 and a second pickup unit 26 is mounted on the rear 22 of the vehicle 10. These pickup units 24 and 26 are preferably as far apart as possible and are located on a line extending longitudinally of the vehicle 10 substantially parallel to the axis of the vehicle 10. As a result they will be equally spaced from the control cable 18 and will receive radiations of equal intensity therefrom. It is preferable for the pickup units 24 and 26 to be mounted close to one side of the vehicle 10 so that both pickup units 24 and 26 will always be disposed on the same side of the cable 18.

In the first embodiment (FIGS. 1 and 2) the front pickup unit 24 comprises an inductive coil 28 the amplification of which is wound and positioned so as to have a voltage induced therein that varies with the distance between the coil 28 and the cable 18. The first coil 28 has one end thereof connected to a rectifier 30 and the other end connected to a condenser 32. The rectifier 30 and condenser 32 are also interconnected with each other so that the condenser will become charged as a result of any voltages induced in the coil 28. A bleed resistor 34 is provided across the condenser 32 for dissipating the charge thereon. The time constant of the resistor 34 and condenser 32 is preferably short enough to allow the total charge on the condenser 32 to follow the low frequency fluctuations in the amplitude of the induced voltage resulting in changes in displacement of the coil 28 from the cable 18. However the time constant is very long compared to the frequency of the induced voltage. It may be thus seen that the condenser 32 will have a D.C. charge thereon corresponding to the displacement between the front coil 28 and the cable 18.

The rear pickup unit 26 is substantially identical to the front pickup 24 in that it also includes an inductive coil 36 that is wound and positioned to have the voltage induced therein vary with the displacement between the coil 36 and the cable 18. The coil 36 is serially connected to a condenser 38 and a rectifier 40 to charge the condenser 38 in response to the induced voltage. A bleed resistor 42 is also disposed across this condenser 38 for dissipating the charge thereon.

The two condensers 32 and 38 are interconnected with each other in opposed relation and with a filter 44 consisting of a condenser 46 and a load resistor 48. Normally the charges on the two condensers 32 and 38 will be equal and opposite. As a result there will be little or no voltage across the load resistor 48. Any minor fluctuations therein resulting from movement of the vehicle 10 relative to the cable 18, etc. will be eliminated by the condenser 46.

Figure 2:
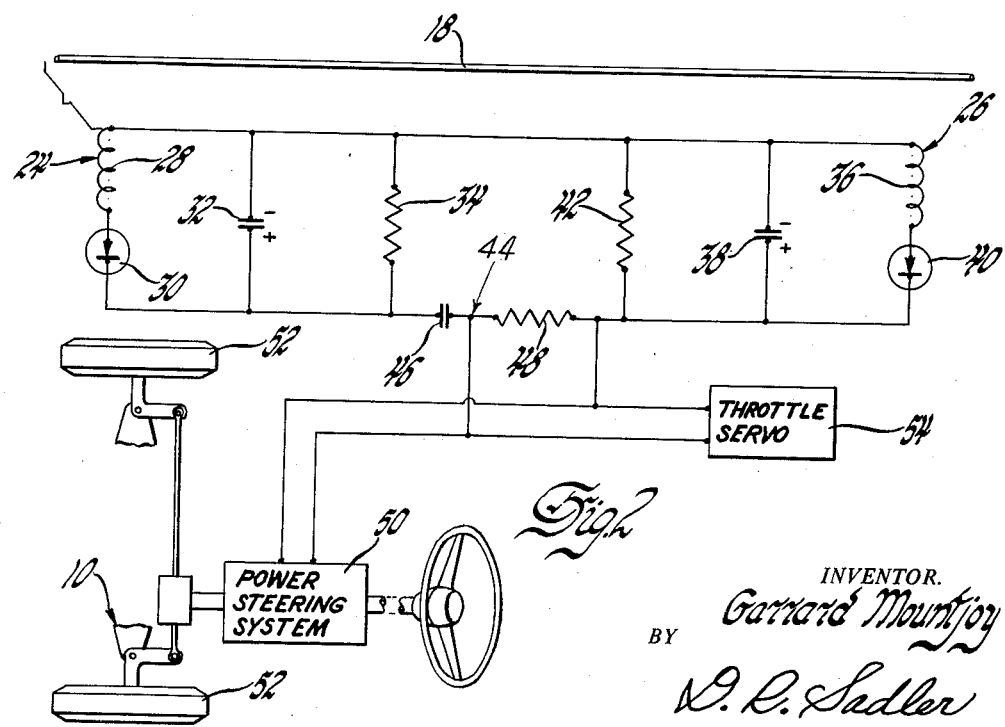
FIGURE 2 is a diagrammatic view of the control apparatus employed in the vehicle of FIGURE 1.

In the event the vehicle 10 enters into a skid condition, the vehicle 10 will deviate from its normal heading, as shown in FIG. 1, and pickup 26 mounted in end 22 of the vehicle will be closest to the control cable 18. This will cause the voltage on condenser 38 to become greater than on condenser 32 and a voltage to appear across the load resistor 48. The amplitude of this voltage will be indicative of the amount of deviation. In addition the polarity of the voltage will indicate the direction of the deviation.

The voltage across the load resistor 48 may be supplied to apparatus suitable for causing a corrective action to be taken to reduce any skidding of the vehicle 10. For example, the voltage may be supplied to a steering servo 50 for turning the dirigible wheels 52 of the vehicle 10. Thus in the event of a skid the vehicle 10 will be turned thereinto. In addition, if desirable, the voltage may be supplied to a throttle servo 54. This servo 54 will be effective to regulate the speed of the engine of the vehicle to reduce the skid tendency. The steering servo 50 preferably includes means responsive to the steering of the vehicle so that any deviations resulting from normal turning of the vehicle 10 will not institute a skid corrective action.

Figure 3:
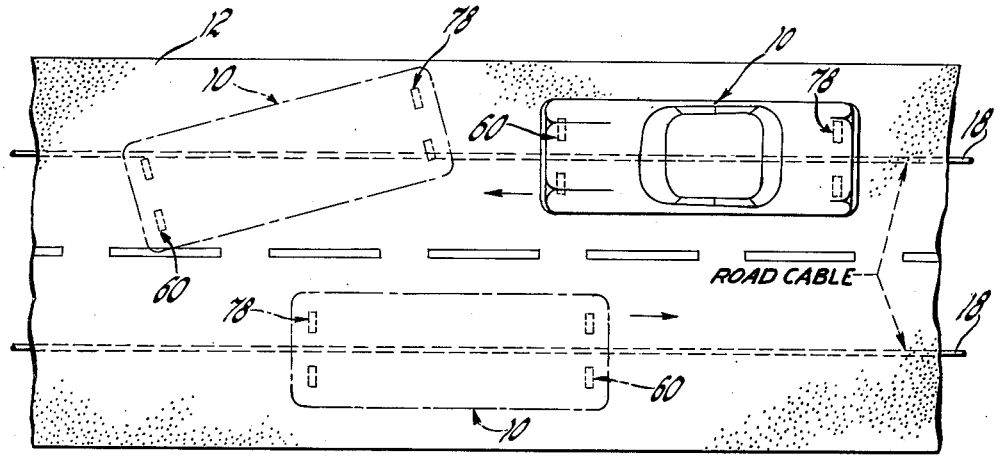
FIGURE 3 is a plan view of a portion of a highway and a vehicle traveling thereon embodying another form of the present invention.
Figure 4:
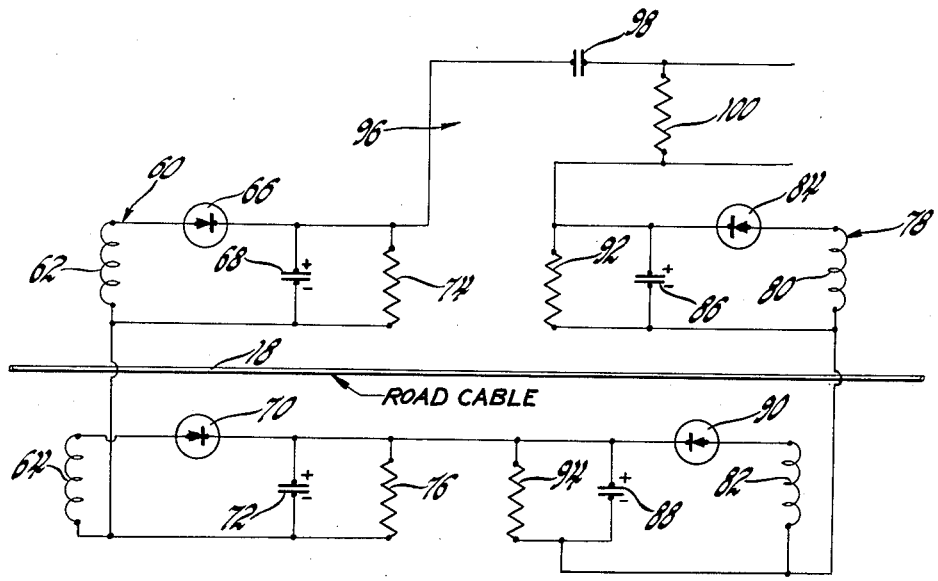
FIGURE 4 is a diagrammatic view of the control apparatus employed in the vehicle of FIGURE 3.

As an alternative, the embodiment in FIGURES 3 and 4 may be employed. In this embodiment the first pickup unit 60 comprises a pair of inductive coils 62 and 64, that are adapted to be mounted on the front of the vehicle 10. The coils 62 and 64 are preferably spaced from each other to normally straddle the cable 18 and be disposed on the opposite sides thereof. The coils 62 and 64 which are preferably substantially identical to each other, are wound and positioned so that the voltage induced in each coil 62 and 64 will vary with the displacement of the coil from the cable 18. The first coil 62 is serially connected to a rectifier 66 and condenser 68 so as to charge the condenser 68 in proportion to the displacement of the coil 62 from the cable 18. The second coil 64 is also interconnected with a rectifier 70 and condenser 72 so to charge the condenser 72 to a voltage corresponding to the displacement of the coil 64. Bleed resistors 74 and 76 may be provided across the condensers 68 and 72 to dissipate the charge thereon as in the first embodiment. The condensers 68 and 72 are interconnected with each other so as to be in opposed relation. In other words the charges thereon will tend to cancel each other. Thus whenever the coils 62 and 64 or pickup unit 60 is properly centered over the road cable 18 the two charges on the condensers 68 and 72 will be equal and opposite. However, in the event the pickup unit 60 is displaced in either direction from the center, the induced voltage in one coil will be greater than in the other. The amount of this difference in voltage will indicate the amount of displacement of the front of the vehicle. At the same time the polarity will correspond to the direction of the displacement.

The rear pickup unit 78 is substantially identical to the front unit 60. It comprises a pair of inductive coils 80 and 82 that are mounted on the rear of the vehicle 10 and in longitudinal alignment with the front unit 60. Thus whenever the front unit 60 is over the cable 18 the rear unit 78 will also be centered. The first rear coil 80 is interconnected with a rectifier 84 and condenser 86 so that the condenser 86 will be charged to correspond to the displacement of the coil 80 from the cable 18. In addition the second rear coil 82 is connected to a condenser 88 and rectifier 90 so as to charge the condenser 88 corresponding to the displacement of the coil 82. Bleed resistors 92 and 94 may be connected across the two condensers 88 and 86 for dissipating the charges thereon. The two condensers 86 and 88 are connected in opposed relation so that the charges thereon will tend to cancel each other. It may thus be seen that the difference between these voltages will represent the displacement of the rear of the vehicle 10 from the cable 18.

The front and rear units 60 and 78 are interconnected with each other and with a D.C. filter 96 having a condenser 98 and load resistor 100. These units 60 and 78 are in opposed relation so that the displacement voltages will be opposed and cancel each other out. Thus if the front and rear ends of the vehicle 10 are equally spaced from the cable 18 the displacement voltages will be equal. As a result there will be no voltage across the load resistor 100 even though the vehicle 10 is not exactly centered over the cable 18. However, if the vehicle 10 is in a skid the displacement voltages will not be equal. Accordingly a deviation voltage will appear across the load resistor 100, the amplitude of which represents the amount of deviation or skid and the polarity of which represents the direction thereof.

The voltage across the load resistor may be applied to a suitable skid correcting apparatus similar to that in the first embodiment.

What is claimed is:

1. In a vehicle control system, means defining a path of vehicle travel, a vehicle having a power steering system and being adapted to move along said path, first and second pickup devices mounted at first and second longitudinally spaced points on said vehicle so as to be effectively equally spaced laterally from said path and on the same side of said path when said vehicle is proceeding parallel therewith, said first and second points being located adjacent the front and rear, respectively, of said vehicle, each of said pickup devices being adapted to produce an electrical signal indicative of the lateral displacement of the pickup device from said path, electrical means connecting said first and second pickup devices in opposed relation to receive the signals produced thereby and adapted to produce a combined output corresponding to the difference between said signals, and means connected to said electrical means and to the power steering system to receive said combined output and to control said power steering system in response thereto whereby longitudinal misalignments of said vehicle relative to said path will be corrected.

2. In a vehicle control system, a guidance cable excited by an electrical current for defining a path of vehicle travel, a vehicle having a power steering system and being adapted to move along said path, a first pickup including an inductive coil responsive to the field established by said current, said first pickup being mounted on said vehicle adjacent the front thereof and effective to produce a first electrical signal indicative of the lateral displacement of said first pickup from said cable, a second pickup including an inductive coil responsive to the field established by said current, said second pickup being mounted on said vehicle adjacent the rear thereof and effective to produce a second electrical signal indicative of the lateral displacement of said second pickup from said cable, said first and second pickups being effectively equally spaced laterally from said cable and on the same side of said cable when the vehicle is proceeding substantially parallel therewith, electrical means connecting said first and second pickups in opposed relation to receive said first and second signals and to produce an output corresponding to the difference in magnitude between said first and second signals, and control means connected to said electrical means and to said power steering system to receive said output and to control said steering system in response thereto whereby longitudinal misalignments of said vehicle relative to said cable will be corrected.

References Cited in the file of this patent

UNITED STATES PATENTS

| | | |
|---|---|---|
| 2,074,251 | Braun | Mar. 16, 1937 |
| 2,317,400 | Paulus et al. | Apr. 27, 1943 |
| 2,331,144 | Silter | Oct. 5, 1943 |
| 2,339,291 | Paulus et al. | Jan. 18, 1944 |
| 2,424,288 | Severy | July 22, 1947 |
| 2,493,755 | Ferrill | Jan. 10, 1950 |
| 2,661,070 | Ferrill | Dec. 1, 1953 |
| 2,690,626 | Gay et al. | Oct. 5, 1954 |
| 2,742,099 | Hagen | Apr. 17, 1956 |
| 2,847,080 | Zworykin | Aug. 12, 1958 |

FOREIGN PATENTS

| | | |
|---|---|---|
| 932,171 | Germany | Aug. 25, 1955 |